Figure 1:
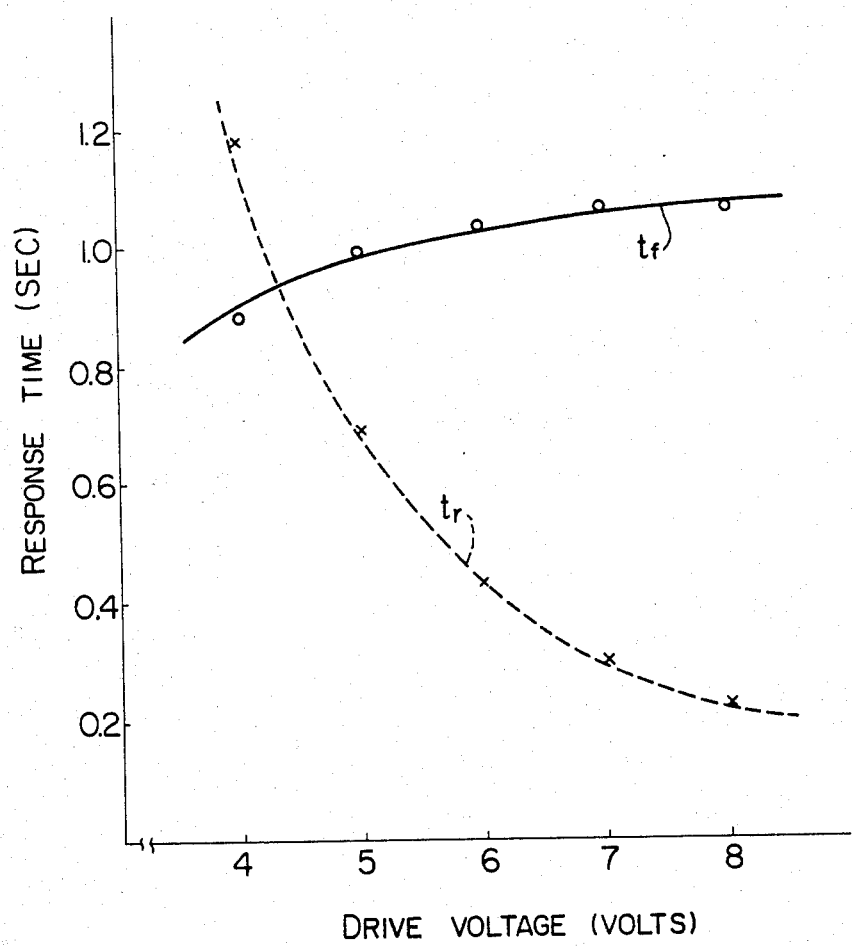

United States Patent [19]

Hasegawa et al.

[11] Patent Number: 4,469,618

[45] Date of Patent: Sep. 4, 1984

[54] LIQUID CRYSTAL MIXTURE

[75] Inventors: Shinji Hasegawa; Kazuhisa Toriyama, both of Mobara, Japan; Ludwig Pohl, Darmstadt; Georg Weber, Erzhausen, both of Fed. Rep. of Germany

[73] Assignees: Hitachi, Ltd., Tokyo, Japan; Merck Patent GmbH, Darmstadt, Fed. Rep. of Germany

[21] Appl. No.: 396,246

[22] Filed: Jul. 8, 1982

[30] Foreign Application Priority Data

Jul. 8, 1981 [JP] Japan .................. 56-105511

[51] Int. Cl.³ .................. C09K 3/34; G02F 1/13
[52] U.S. Cl. .................. 252/299.5; 252/299.63; 350/350 R
[58] Field of Search .................. 252/299.5, 299.63; 350/350 R

[56] References Cited

U.S. PATENT DOCUMENTS

| 4,130,502 | 12/1978 | Eidenschink et al. | 252/299.63 |
|---|---|---|---|
| 4,154,697 | 5/1979 | Eidenschink et al. | 252/299.63 |
| 4,198,130 | 4/1980 | Boller et al. | 252/299.63 |
| 4,228,030 | 10/1980 | Cole, Jr. | 252/299.63 |
| 4,229,315 | 10/1980 | Krause et al. | 252/299.63 |
| 4,330,426 | 5/1982 | Eidenschink et al. | 252/299.63 |
| 4,331,552 | 5/1982 | Eidenschink et al. | 252/299.63 |

FOREIGN PATENT DOCUMENTS

| 54-99785 | 8/1979 | Japan | 252/299.63 |
|---|---|---|---|
| 56-2372 | 1/1981 | Japan | 252/299.63 |
| 56-118481 | 9/1981 | Japan | 252/299.63 |
| 57-18777 | 1/1982 | Japan | 252/299.63 |
| 57-18778 | 1/1982 | Japan | 252/299.63 |
| 57-21479 | 2/1982 | Japan | 252/299.63 |
| 57-34176 | 2/1982 | Japan | 252/299.63 |
| 57-2097418 | 11/1982 | Japan | 252/299.63 |

*Primary Examiner*—Teddy S. Gron
*Attorney, Agent, or Firm*—Antonelli, Terry & Wands

[57] ABSTRACT

A liquid crystal composition comprising, as the essential components, trans-4-n-propyl-(4-ethylphenyl)-cyclohexane, trans-4-n-propyl-(4-cyanophenyl)-cyclohexane, trans-4-n-pentyl-(4-cyanophenyl)-cyclohexane, trans-4-n-pentyl-(4'-ethylbiphenyl-4)-cyclohexane and 4-(trans-4-n-pentylcyclohexyl)-4'-(trans-4-n-propylcyclohexyl)-biphenyl is drivable over a wide temperature range and can be operated rapidly at low temperatures.

10 Claims, 3 Drawing Figures

LIQUID CRYSTAL MIXTURE

The present invention relates to a liquid crystal composition for use in a TN (twisted nematic) liquid crystal display element, and more particularly to a liquid crystal composition which is drivable over a wide temperature range and can be operated rapidly at low temperatures.

Because of their low operating voltage and extremely low power consumption, liquid crystal display elements are widely used in electronic calculators and wrist watches, and a rapid increase of the application of liquid crystal for various meters and display devices is observed recently. Moreover, as it is possible to construct a flat-panel display with a thickness of the order of 2 millimeters, and visible at high ambient light, liquid crystal display elements are regarded as having a promising future in an application to automobile instrument panels.

Generally, requirements for the liquid crystal display element for automobile uses are that it should be operated over a wide temperature range of from $-30°$ to $+80°$ C. and that it should have high-speed responsiveness such as both rise time and fall time being 0.5 sec or less even at a temperature as low as $-30°$ C.

The rise time $t_r$ and the fall time $t_f$ of the liquid crystal are generally expressed by the following equations respectively:

$$t_r = \frac{\eta \cdot d^2}{\epsilon_o \Delta \epsilon V^2 - k^2 \pi^2}$$

$$t_f = \frac{\eta \cdot d^2}{k \pi^2}$$

wherein $\eta$ is the viscosity of liquid crystal; d, the gap between the substrates; $\epsilon_o \Delta \epsilon$, the dielectric constant of liquid crystal; v, the driving voltage to be applied to liquid crystal; k, elastic constant; and $\pi$, the circular constant.

Figure 2:
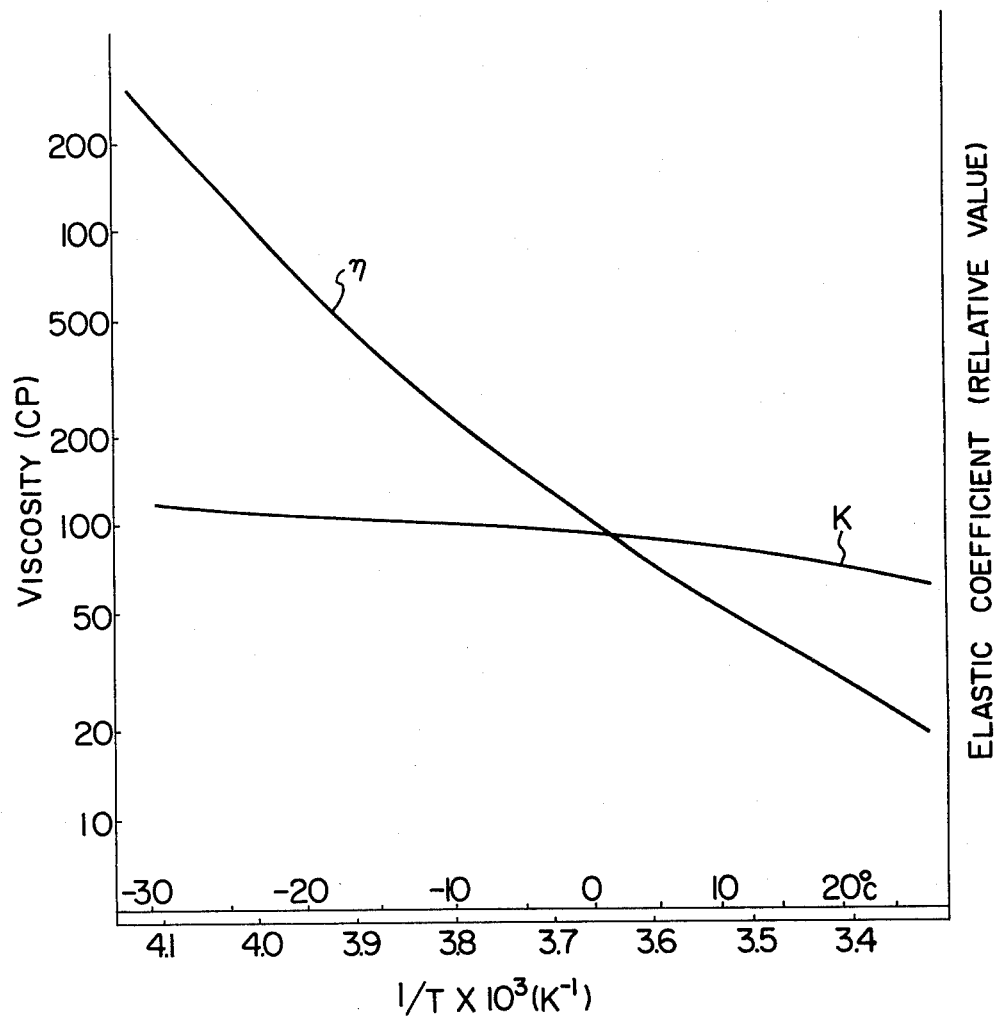

The rise time $t_r$ for liquid crystal can be thus controlled by the driving voltage v. However, the fall time $t_f$ is virtually constant irrespective of the driving voltage v. For example, the response time of liquid crystal ZLI-1132 available from Merck & Co., Inc. is dependent on the driving voltage as shown in FIG. 1 at $-20°$ C. when statically driven at 32 Hz. Supposing it is driven at 5 to 8 volts in FIG. 1, the fall time $t_f$ for the liquid crystal will be greater than the rise time $t_r$ by several times. It becomes important, therefore, to reduce the fall time $t_f$ in order to improve the response time of the liquid crystal for automobile uses. The fall time $t_f$ is, as indicated by the equation given above, proportional to the ratio of the viscosity $\eta$ to the elastic constant k, $\eta/k$. It should be noted, however, that the increase in the viscosity $\eta$ with a decrease in temperature is overwhelmingly greater than the increase in the elastic constant k with a decrease in temperature as shown in FIG. 2, thus the largeness of $\eta/k$ in the lower temperature region is almost determined by the viscosity $\eta$ only. It is therefore necessary to minimize the viscosity of the liquid crystal at lower temperatures as much as possible in order to reduce the fall time $t_f$ at lower temperature region.

On the other hand, the nematic-to-isotropic transition temperature (N—I point) of liquid crystal materials should be at least 80° C. or higher, and preferably 85° C. or higher in order to operate the liquid crystal display element at a temperature as high as $+80°$ C. Supposing a mixture of liquid crystals is a regular solution, N—I point ($T_{NI}$) of the liquid crystal mixture will be expressed by the following equation:

$$T_{NI} = \sum_i T_i \cdot x_i$$

wherein $T_i$ is a N—I point of the component i and $x_i$ is a mole fraction. Thus, it is relatively easy to raise the N—I point of the mixed liquid crystal. However, because of the correlation between N—I point of a liquid crystal and its viscosity $\eta$, the viscosity $\eta$ generally tends to rise correspondingly with the rise of N—I point and vice versa. This made it extremely difficult to maintain a high N—I point and a low viscosity at the same time in a liquid crystal composition.

Even some of relatively less viscous liquid crystal materials heretofore available in the market or as a sample which had N—I point of more than 80° C. had the viscosity of 200 CP or more at 0° C. and 2000 CP or more at $-20°$ C. This brought about the fall time $t_f$ of 2 seconds or more at $-20°$ C. Generally speaking, it is necessary that the viscosity should at least be 50 to 60 CP or less at 0° C., and 300 CP or less, preferably 200 CP or less at $-20°$ C. in order to make both the rise time and fall time 0.5 sec or less at $-30°$ C.

Presently there exists no liquid crystal composition of which N—I point is 80° C. or higher while C—N (crystal-to-nematic) point is $-30°$ C. or lower. The C—N point of multi-component liquid crystal mixture is usually in the range of about $-15°$ to $-10°$ C. A reason why the liquid crystal mixture is operative at low temperatures of $-20°$ C. to $-30°$ C. is because the nematic phase can be present in super-cooling state, and the stability of this super-cooling state varies dependent on components and composition of the mixed liquid crystal. The liquid crystal materials for automobile uses should be maintained in this super-cooling state at $-30°$ C. for a long period of time in order to ensure display operations at temperatures as low as $-30°$ C.

As above described, the liquid crystal material for automobile uses should satisfy the following requirements in order to cover the wide operating temperature range of between $-30°$ C. to $+80°$ C. and to realize quick response of 0.5 sec or less at $-30°$ C.

(1) The N—I point should be 80° C. or higher, and preferably 85° C. or higher.

(2) The nematic phase in super-cooling should be stably maintained for a long period of time at $-30°$ C.

(3) The viscosity should be 50 to 60 CP or less at 0° C, 300 CP or less and preferably 200 CP or less at $-20°$ C.

However, no liquid crystal composition which has the above features has heretofore been available.

It is, therefore, an object of the present invention to provide a liquid crystal composition which satisfies the requirements mentioned above.

The present invention provides a liquid crystal composition comprising, as the essential components, trans-4-n-propyl-(4-ethylphenyl)-cyclohexane, trans-4-n-propyl-(4-cyanophenyl)-cyclohexane, trans-4-n-pentyl-(4-cyanophenyl)-cyclohexane, trans-4-n-phenyl-(4'-ethylbiphenyl-4)-cyclohexane and 4-(trans-4-n-pentylcyclohexyl)-4'-(trans-4-n-propylcyclohexyl)-biphenyl.

Figure 3:
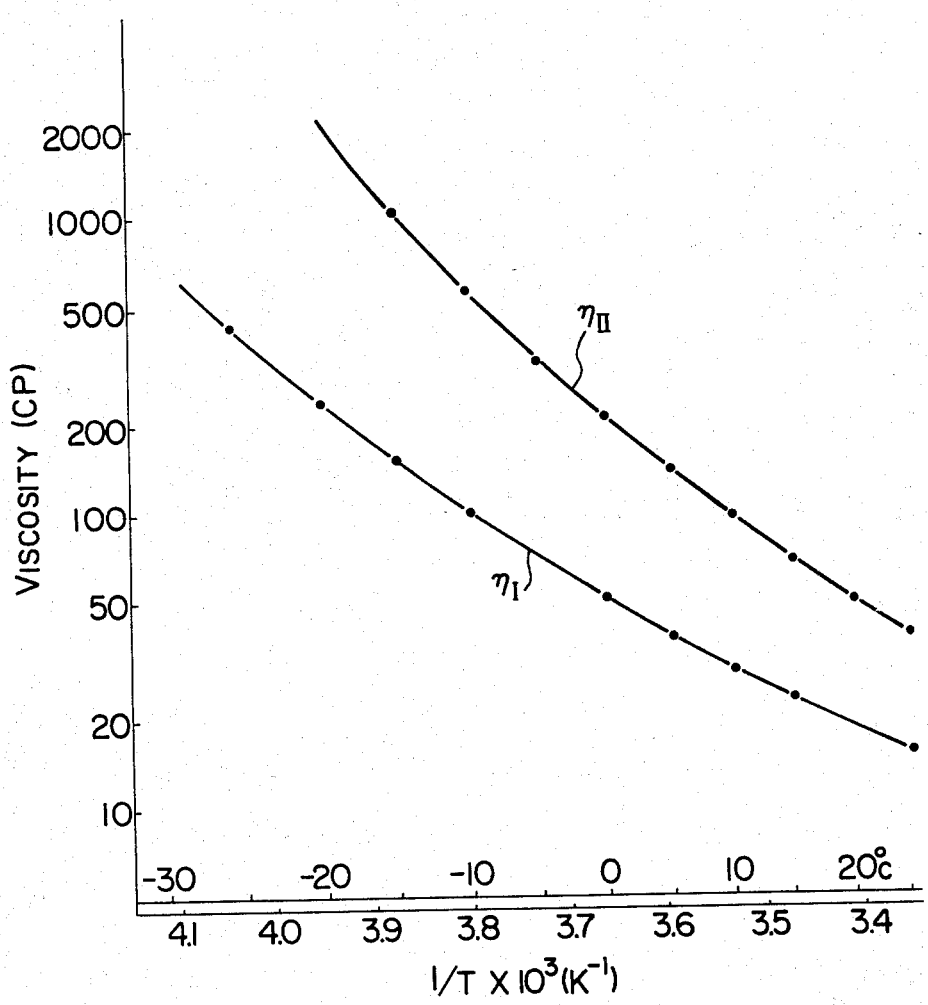

In the attached drawings,

FIG. 1 is a graph showing the dependence of rise and fall response times of a TN liquid crystal display element on the driving voltage, FIG. 2 is a graph showing a general tendency in the temperature dependence of the viscosity and elastic constant of the liquid crystals, and FIG. 3 shows the temperature dependence of the viscosity of the liquid crystal composition according to the present invention.

The composition of the present invention comprises five compounds as the essential components to realize the object of the invention; namely, trans-4-n-propyl-(4-ethylphenyl)-cyclohexane (hereinafter referred to as the compound 1), trans-4-n-propyl-(4-cyanophenyl)-cyclohexane (hereinafter referred to as the compound 2), trans-4-n-pentyl-(4-cyanophenyl)-cyclohexane (hereinafter referred to as the compound 3), trans-4-n-pentyl-(4'-ethylbiphenyl-4)-cyclohexane (hereinafter referred to as the compound 4), and 4-(trans-4-n-pentyl-cyclohexyl)-4'-(trans-4-n-propylcyclohexyl)-biphenol (hereinafter referred to as the compound 5). Mixtures of these compounds will give liquid crystal compositions which satisfy the requirements (1) through (3) as stated above.

The liquid crystal composition according to the present invention exhibits its properties most effectively when the compound 1 is contained in the range of from 15 to 26 mole %, the compound 2 from 18 to 24 mole %; the compound 3 from 22 to 30 mole %, the compound 4 from 16 to 25 mole %, and the compound 5 from 5 to 9 mole % respectively.

The liquid crystal composition of the present invention may further contain one or more third components such as trans-4-n-propyl-(4-ethoxyphenyl)-cyclohexane, etc.

The present invention will now be described in more detail by way of the following examples.

EXAMPLE 1

A liquid crystal composition I comprising 20 mole % of the compound I, 22 mole % of the compound 2, 28 mole % of the compound 3, 24 mole % of the compound 4 and 6 mole % of the compound 5 was prepared. The composition I was determined to have an N—I point of 83.1° C. The viscosity of the composition I was measured by a rotary viscometer and the result is shown by the characteristic curve $\eta_I$ in FIG. 3 which illustrates the temperature dependence of the viscosity. FIG. 3 also shows the characteristic curve $\eta_{II}$ which shows the temperature dependence of the viscosity of a conventional liquid crystal composition as shown in Table 1 as Comparative Example. As is clear from the graph, the composition I has the viscosity of 51 CP at 0° C., 237 CP at −20° C., achieving an uncomparably low viscosity.

TABLE 1

| Compounds | Mole % |
|---|---|
| Composition | |
| C₅H₁₁—⟨◯⟩—⟨◯⟩—CN | 36 |
| C₄H₉—⟨H⟩—CO₂—⟨◯⟩—OC₂H₅ | 15 |

TABLE 1-continued

| Compounds | Mole % |
|---|---|
| CH₃—⟨H⟩—CO₂—⟨◯⟩—OC₅H₁₁ | 15 |
| C₃H₇—⟨H⟩—CO₂—⟨◯⟩—OC₂H₅ | 15 |
| C₂H₅—⟨H⟩—⟨N◯N⟩—⟨◯⟩—CN | 8 |
| C₅H₁₁—⟨H⟩—⟨N◯N⟩—⟨◯⟩—CN | 5 |
| C₅H₁₁—⟨◯⟩—⟨◯⟩—⟨◯⟩—CN | 6 |

The viscosity of a liquid crystal generally increase rapidly as the temperature becomes lowered, and the curve obtained by plotting logarithms of the viscosity against the reciprocals of the absolute temperature shows a steep gradient in the lower temperature regions. As can be seen from FIG. 3, the viscosity curve $\eta_I$ of the composition I not only shows a lower viscosity but its temperature gradient is smaller when compared with the curve $\eta_{II}$ of the liquid crystal composition of Comparative Example. As a result, the difference in viscosity between the composition I and the liquid crystal composition of Comparative Example becomes greater when the temperature becomes lower. The composition I of the present invention demonstrates greater effects as a low viscous material when the temperature is lower.

The composition I was subsequently sealed in a first cell with a gap d between the substrates positioned opposite to each other being 7.9 μm for measuring its electro-optical characteristics. A chiral substance such as 4-(4-hexyloxybenzoyloxy)benzoic acid-d-2-octyl ester was added for the purpose of reducing the response time $t_f$ of the liquid crystal. The concentration of the substance was such that cholesteric pitch of the liquid crystal would be equal to 4 times the cell gap. When stationally driven at 32 Hz and 6 V, the rise time of the first cell was 0.35 sec. and the fall time thereof 0.5 sec., each at −30° C. The first cell was then left standing at −30° C., but no crystallization occurred after 1 month and it was confirmed that the cell operated normally after the test.

EXAMPLE 2

A liquid composition II comprising 25 mole % of the compound 1, 19 mole % of the compound 2, 24 mole % of the compound 3, 25 mole % of the compound 4 and 7 mole % of the compound 5 was prepared. The N—I point of the composition was 83.5° C. and the viscosity thereof was 49 CP at 0° C. and 232 CP at −20° C., respectively. To the composition II was added the chiral substance in the same manner as in Example 1 and sealed in a second cell having the gap d of 7.8 μm between the opposing substrates for measurement of the electro-optical characteristics. When statically drived at 32 Hz and 6 V, the rise time was 0.38 sec and the fall time 0.48 sec, each at −30° C. The cell was left standing at −30° C. for more than a month, but it showed no crystallization and was confirmed to operate normally after the test.

EXAMPLE 3

A liquid crystal composition III comprising 16 mole % of the compound 1, 18 mole % of the compound 2, 22 mole % of the compound 3, 23 mole % of the compound 4, 6 mole % of the compound 5, and 15 mole % of trans-4-n-propyl-(4-ethoxyphenyl)-cyclohexane was prepared. The N—I point of the composition III was 83.8° C. and its viscosity was 48.5 CP at 0° C. and 229 CP at −20° C. The chiral substance was added to the composition III as in Example 1 prior to sealing the same in third and fourth cells having the gap d between the opposing substrates of 7.2 μm and 8.5 μm, respectively. When statically drived at 32 Hz and 6 V, the rise time for the third cell was 0.32 sec and the fall time 0.42 sec, each at −30° C., while those for the fourth cell were 0.42 sec and 0.55 sec, respectively. These two cells were left standing at −30° C. for 1 month, and at −40° C. for additional one week. No crystallization was observed, and it was confirmed that the cells operated normally after the test.

The composition III contains 15 mole % of trans-4-n-propyl-(4-ethoxyphenyl)-cyclohexane in addition to the essential components. However, no limitation is imposed on the kind of materials to be added, provided that such an addition does not affect the N—I point, viscosity and stability of the final composition at lower temperatures. It should be noted that the overall concentration of the essential components should be 80 mole % or more.

EXAMPLE 4

A liquid crystal composition IV comprising 20 mole % of the compound 1, 23 mole % of the compound 2, 30 mole % of the compound 3, 18 mole % of the compound 4 and 9 mole % of the compound 5 was prepared. The composition IV had the N—I point of 84.0° C. and the viscosity of 52 CP at 0° C. and 242 CP at −20° C. The chiral substance was added to the composition as in Example 1 and sealed in a fifth cell having the gap d between the opposing substrates of 7.0 μm. When statically drived at 32 Hz and 6 V, the rise time and the fall time were 0.30 sec and 0.4 sec, at −30° C. respectively. The fifth cell was left standing at −30° C., but no crystallization was observed after 1 month and it was confirmed that the cell operated normally after the test.

As has been described above, the liquid crystal composition according to the present invention is operable over a wide temperature range of from −30° to +80° C. and it is also possible to achieve a high-speed response of 0.5 sec or less at −30° C. Thus, it has remarkable features which enable production of liquid crystal display elements for automobile instrument panels of high quality and reliability.

What is claimed is:

1. A liquid crystal composition consisting essentially of:

trans-4-n-propyl-(4-ethylphenyl)-cyclohexane in an amount of 15 to 26 mole %,
trans-4-propyl-(4-cyanophenyl)-cyclohexane in an amount of 18 to 24 mole %,
trans-4-n-pentyl-(4-cyanophenyl)-cyclohexane in an amount of 22 to 30 mole %,
trans-4-n-pentyl-(4'-ethylbiphenyl-4)-cyclohexane in an amount of 16 to 25 mole %, and
4-(trans-4-n-pentylcyclohexyl)-4'-(trans-4-n-propylcyclohexyl)-biphenyl in an amount of 5 to 9 mole %.

2. A liquid crystal composition according to claim 1, consisting essentially of:

trans-4-n-propyl-(4-ethylphenyl)-cyclohexane in an amount of 20 mole %,
trans-4-n-propyl-(4-cyanophenyl)-cyclohexane in an amount of 22 mole %,
trans-4-n-pentyl-(4-cyanophenyl)-cyclohexane in an amount of 28 mole %,
trans-4-n-pentyl-(4'-ethylbiphenyl-4)-cyclohexane in an amount of 24 mole %, and
4-(trans-4-n-pentylcyclohexyl)-4'-(trans-4-n-propylcyclohexyl)-biphenyl in an amount of 6 mole %.

3. A liquid crystal composition according to claim 1, consisting essentially of:

trans-4-n-propyl-(4-ethylphenyl)-cyclohexane in an amount of 25 mole %,
trans-4-n-propyl-(4-cyanophenyl)-cyclohexane in an amount of 19 mole %,
trans-4-n-pentyl-(4-cyanophenyl)-cyclohexane in an amount of 24 mole %,
trans-4-n-pentyl-(4'-ethylbiphenyl-4)-cyclohexane in an amount of 25 mole %, and
4-(trans-4-n-pentylcyclohexyl)-4'-(trans-4-n-propylcyclohexyl)-biphenyl in an amount of 7 mole %.

4. A liquid crystal composition according to claim 1, consisting essentially of:

trans-4-n-propyl-(4-ethylphenyl)-cyclohexane in an amount of 16 mole %,
trans-4-n-propyl-(4-cyanophenyl)-cyclohexane in an amount of 18 mole %,
trans-4-n-pentyl-(4-cyanophenyl)-cyclohexane in an amount of 22 mole %,
trans-4-n-pentyl-(4'-ethylbiphenyl-4)-cyclohexane in an amount of 23 mole %, and
4-(trans-4-n-pentylcyclohexyl)-4'-(trans-4-n-propylcyclohexyl)-biphenyl in an amount of 6 mole %.

5. A liquid crystal composition according to claim 1, consisting essentially of:

trans-4-n-propyl-(4-ethylphenyl)-cyclohexane in an amount of 20 mole %,
trans-4-n-propyl-(4-cyanophenyl)-cyclohexane in an amount of 23 mole %,
trans-4-n-pentyl-(4-cyclophenyl)-cyclohexane in an amount of 30 mole %,
trans-4-n-pentyl-(4'-ethylbiphenyl-4)-cyclohexane in an amount of 18 mole %, and
4-(trans-4-n-pentylcyclohexyl)-4'-(trans-4-n-propylcyclohexyl)-biphenyl in an amount of 9 mole %.

6. A liquid crystal composition consisting essentially of:

trans-4-n-propyl-(4-ethylphenyl)-cyclohexane in an amount of 15 to 26 mole %,
trans-4-n-propyl-(4-cyanophenyl)-cyclohexane in an amount of 18 to 24 mole %,
trans-4-n-pentyl-(4-cyanophenyl)-cyclohexane in an amount of 22 to 30 mole %, trans-4-n-pentyl-(4'-ethylbiphenyl-4)-cyclohexane in an amount of 16 to 25 mole %, 4-(trans-4-n-pentylcyclohexyl)-4'-(trans-4-n-propyl-cyclohexyl)-biphenyl in an amount of 5 to 9 mole %, and trans-4-n-propyl-(4-ethoxyphenyl)-cyclohexane in an amount of 15 mole %.

7. A liquid crystal composition consisting essentially of:

trans-4-n-propyl-(4-ethylphenyl)-cyclohexane in an amount of 16 mole %, trans-4-n-propyl-(4-cyanophenyl)-cyclohexane in an amount of 18 mole %, trans-4-n-pentyl-(4-cyanophenyl)-cyclohexane in an amount of 22 mole %, trans-4-n-pentyl-(4'-ethylbiphenyl-4)-cyclohexane in an amount of 23 mole %, 4-(trans-4-n-pentylcyclohexyl)-4'-(trans-4-n-propyl-cyclohexyl)-biphenyl in an amount of 6 mole %, and trans-4-n-propyl-(4-ethoxyphenyl)-cyclohexane in an amount of 15 mole %.

8. A liquid crystal composition consisting essentially of:

trans-4-n-propyl-(4-ethylphenyl)-cyclohexane in an amount of 15 to 26 mole %, trans-4-n-propyl-(4-cyanophenyl)-cyclohexane in an amount of 18 to 24 mole %, trans-4-n-pentyl-(4-cyanophenyl)-cyclohexane in an amount of 22 to 30 mole %, trans-4-n-pentyl-(4'-ethylbiphenyl-4)-cyclohexane in an amount of 16 to 25 mole %, 4-(trans-4-n-pentylcyclohexyl)-4'-(trans-4-n-propyl-cyclohexyl)-biphenyl in an amount of 5 to 9 mole %, trans-4-n-propyl-(4-ethoxyphenyl)cyclohexane in an amount of 15%, and 4-(4-hexyloxybenzoyloxy)benzoic acid-d-2-octyl ester for reducing the response time $t_r$ of the liquid crystal in a concentration such that the cholesteric pitch of the liquid crystal is equal to four times the cell gap.

9. A liquid crystal composition consisting essentially of:

trans-4-n-propyl-(4-ethylphenyl)-cyclohexane in an amount of 15 to 26 mole %, trans-4-n-propyl-(4-cyanophenyl)-cyclohexane in an amount of 18 to 24 mole %, trans-4-n-pentyl-(4-cyanophenyl)-cyclohexane in an amount of 22 to 30 mole %, trans-4-n-pentyl-(4'-ethylbiphenyl-4)-cyclohexane in an amount of 16 to 25 mole %, 4-(trans-4-n-pentylcyclohexyl)-4'-(trans-4-n-propyl-cyclohexyl)-biphenyl in an amount of 5 to 9 mole %, and 4-(4-hexyloxybenzoyloxy)benzoic acid-d-2-octyl ester for reducing the response time $t_r$ of the liquid crystal in a concentration such that the cholesteric pitch of the liquid crystal is equal to four times the cell gap.

10. A liquid cyrstal composition according to claim 1, wherein said liquid crystal satisfies the following requirements:

(1) the N—I point is 80° C. or higher;
(2) the nematic phase in super-cooling is stably maintained for a long period of time at −30° C.; and
(3) the viscosity is 50 to 60 CP or less at 0° C. and 300 CP or less at −20° C.

* * * * *